Aug. 30, 1932. H. CHIREIX 1,874,899
MEASURING INSTRUMENT
Filed Sept. 17, 1929 2 Sheets-Sheet 1
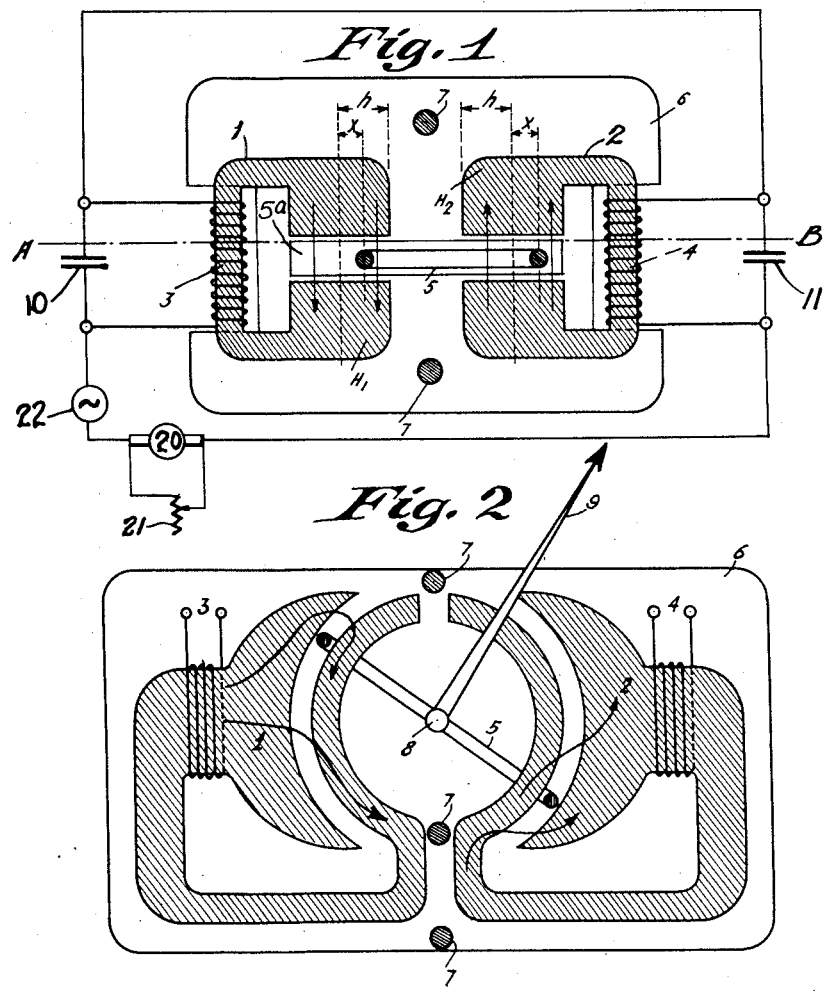
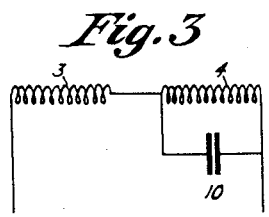
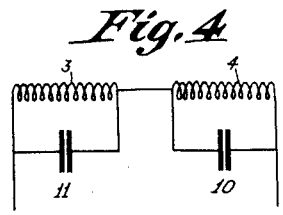
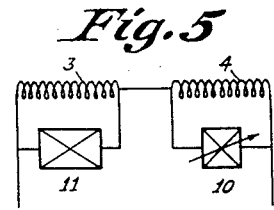
INVENTOR
HENRI CHIREIX
BY
ATTORNEY Aug. 30, 1932.  H. CHIREIX  1,874,899
MEASURING INSTRUMENT
Filed Sept. 17, 1929  2 Sheets-Sheet 2
*Fig. 6*
*Fig. 1A.*
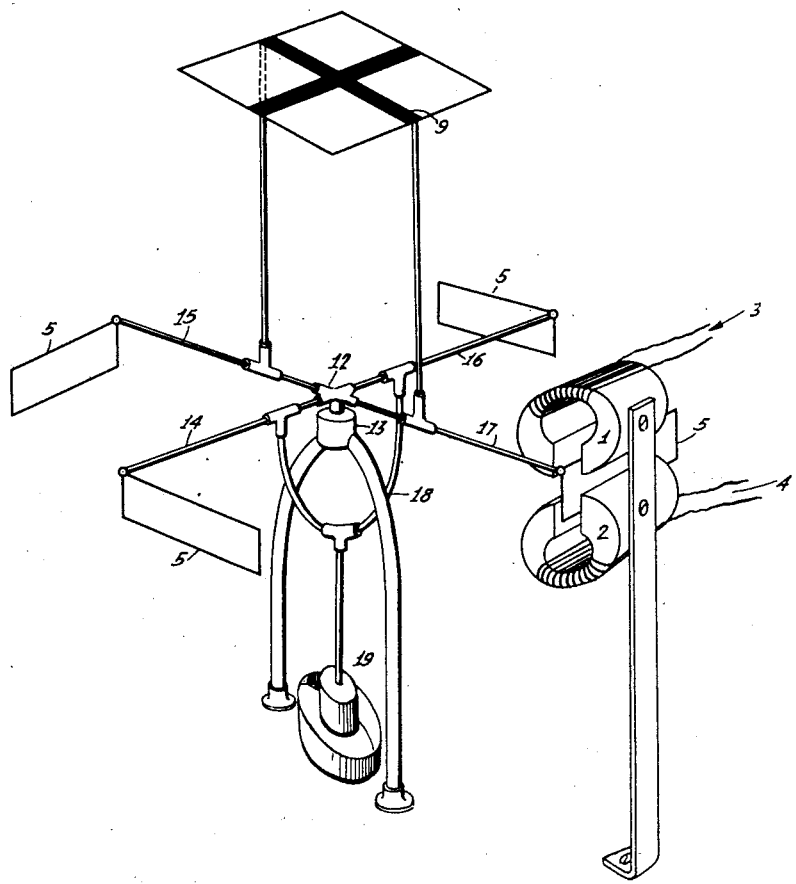
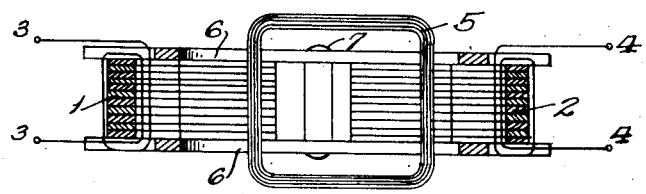
INVENTOR
HENRI CHIREIX
BY
ATTORNEY Patented Aug. 30, 1932

1,874,899

UNITED STATES PATENT OFFICE

HENRI CHIREIX, OF PARIS, FRANCE, ASSIGNOR TO COMPAGNIE GENERALE DE TELE-GRAPHIE SANS FIL, A CORPORATION OF FRANCE

MEASURING INSTRUMENT

Application filed September 17, 1929, Serial No. 393,169, and in France September 27, 1928.

The present invention has as its object an entire class of measuring instruments or galvanometers of the electrodynamic type operating only on alternating current, and in which the final balanced position of the movable index hand or needle is only governed by relationships between currents flowing through the various exciting coils of the instrument. The said equilibrium position is thus independent of the absolute values of the currents as long as the ratios do not undergo any changes. More particularly speaking, if the various exciting coils of the instrument are associated with resistances, condensers or inductance coils, with the assembly being connected with the same line, the position of balance will be independent of the potential fluctuations of this network or supply line. The invention relates moreover particularly to instruments fulfilling these conditions and in which the torque or couple is furnished by currents induced in one or more short-circuited turns. Such a construction moreover, insures maximum lightness and therefore high natural periods.

In the simplest case, the moving needle or pointer is only capable of a rotational movement about one axis or pivot; only two exciting coils are required, and a single shorted turn suffices to set up the couple, the deflection being then proportional to the quotient of the difference of the magnetic fields due to the exciting coils by the sum total of these fields. In other words, denoting by $H_1$ and $H_2$ the respective fields, by $\alpha$ the deflection, and by $\alpha_0$ a coefficient of proportionality, there is $$\frac{\alpha}{\alpha_0} = \frac{H_1 - H_2}{H_1 + H_2} = \frac{1 - \frac{H_2}{H_1}}{1 + \frac{H_2}{H_1}}$$

The deflection $\alpha$ is in the same direction as $(H_1 - H_2)$ and depends only upon the relations of the currents setting up the fields $H_1$ and $H_2$, at least inside the limits where no saturation arises, and $$\alpha = f \frac{(H_1)}{(H_2)}.$$

In a more complicated case, the mobile pointer is capable of a movement of rotation about one axis and at the same time of rotating about another axis at right angles to the former (in the manner of a dial), two pairs of energizing coils at least being required in that case as well as at least two short-circuited turns. If, then, $H_3$ and $H_4$ are the fields due to the second group of coils, the balanced position of the pointer (which may occupy any desired position within a solid angle) is entirely determined by a function $\varphi$, thus $$\alpha = \varphi\left(\frac{H_1}{H_2}, \frac{H_1}{H_3}, \frac{H_1}{H_4}\right)$$

Finally, in the most complicated general case, the moving pointer (say, a needle), in addition to the movements hereinbefore mentioned, is able to undergo a rotational movement about itself, and in this case at least three pairs of energizing coils, and three short-circuited turns will then be required. The position of equilibrium of the pointer as well as its orientation about its own axis are then entirely determined by a function $\varphi$ thus:

$$\alpha = \varphi\left(\frac{H_1}{H_2}, \frac{H_1}{H_3}, \frac{H_1}{H_4}, \frac{H_1}{H_5}, \frac{H_1}{H_6},\right)$$

where $H_5$ and $H_6$ are the two fields set up by the third pair of coils.

In all of the instances hereinbefore considered, the various fields are approximately in phase, or else in phase opposition, according to the direction of winding so that the composition of the two fields does not result in the production of rotating fields.

The idea underlying this invention will be understood more easily by reference to Figures 1 and 1a. Figure 2 shows by way of example one practical embodiment of a measuring device according to this invention. Figures 3 and 4 illustrate practical circuit schemes adapted to use the instrument as a frequency meter. Figure 5 shows an arrangement in which the instrument may be employed for the direct measurement of resistance, inductance or capacity. Figure 6 illustrates a practical form of construction of a measuring instrument of the type disclosed in Figures 1 and 2.

Referring to Figures 1 and 1a, 1 and 2 denote two magnetic circuits preferably similar in nature and built up, as shown more in detail in Figure 1a of thin laminations, 3 and 4 denote the two field coils. The arrows indicate the direction of the flux at a given instant, 5 is the short-circuited turn constituting the moving parts and being supported in such a way that it is capable of a movement of translation from left to right, or from right to left in slot 5a. If the magnetic circuits are identical, and if they have an interferric space or gap that is constant and uniform, a position of balance will be established when the current induced in the moving turn is of zero value, in other words, when the aggregate flux traversing it is zero or when $$H_1(h-x) = H_2(h+x) \quad \text{or} \quad \frac{x}{h} = \frac{1 - \frac{H_2}{H_1}}{1 + \frac{H_2}{H_1}}$$

denoting by $H_1$ the field intensity inside the air-gap of the first magnetic circuit; $H_2$ the field intensity in the air-gap of the second magnetic circuit; $x$ the distance from the edge of the moving coil (relative) to the axis of the field in the air-gap; and $h$ half the width of the field.

As to the rest this position of equilibrium is stable. It will also be noted that the magnetic circuits 1 and 2 are separate.

Such leakage or stray as may arise could be counteracted or offset by disposing the magnetic circuits between flanges or sideplates 6 with assembly rivets 7, both 6 and 7 then forming a short-circuit precluding the direct flow of the flux from (1) to (2).

Figure 2 illustrates a practical embodiment of Figure 1, the same reference numerals being used to denote identical parts. The mobile coil in this case undergoes a rotation about an axis 8. The pointer 9 (needle) is mounted integral with the short-circuited turn 5.

Figure 3 shows the coil arrangement of an instrument as hereinbefore disclosed used as a frequency meter, 3 and 4 are the two coils, 10 is a condenser. Calculation shows that it is then desirable to design the coil 3 with a limited number of turns (ammeter coil) and coil 4 with a large number of turns (voltmeter coil across the terminals of the condenser). Condenser 10, moreover, is dimensioned in such a way that the circuit (4-10) is tuned to a frequency slightly lower than the frequency to be measured. Under these conditions satisfactory reading sensitiveness and accuracy is insured throughout the instrument scale, with the graduations or divisions being crowded together only in the ranges of higher frequencies.

Figure 4 shows a second scheme more particularly designed and adapted for the case where a limited frequency range is needed. 3 and 4 then are the two coils of the instrument being preferably made similar. 10 and 11 are two capacities. The circuit (3-11) is to be set so as to be tuned to a frequency slightly lower than the lowest frequency to be measured, while the circuit (4-10), on the contrary, is to be regulated to a frequency slightly higher than the highest frequency to be measured. The closer the natural periods of the two circuits, the more the range actually covered will be reduced.

Figure 5 shows an arrangement adapted to compare two impedances of the same nature (capacity, inductance, resistances or impedances having approximately the same phase angle value). 3 and 4 are the two coils of the instrument built with very fine wire and dimensioned according to the character of the electrical quantities to be measured. 11 and 10 stand, respectively, for the standard impedance and the impedance to be measured.

Finally, Figure 6 shows a schematic picture of a double-movement type of galvanometer. In this galvanometer the two movements of rotation are produced independently by assemblies similar to those in Figure 1.

The pivot 12 supported by a bearing 13 mounted upon a fixed upright, supports four orthogonal arms 14, 15, 16 and 17 and at the end of each of these is fixed a winding such as is indicated at 5. Upon two opposite arms 15 and 17, for instance, is mounted the support of the "character board" 9. Upon the two other arms is mounted the fork 18 sustaining in a rigid manner the damper 19 consisting, for instance, of a small mass immersed in a suitable liquid or any other damping or dashpot means depending upon air, magnetism, electromagnetism, mechanics, etc., for its action.

Each horizontal side of winding 5 is embraced by an electromagnet such as 3 and 4 producing an additive action on the diametrally opposite windings so that by virtue of attraction and repulsion of the windings by the four orthogonal systems, the pivot describes a vertical solid angle whose apex coincides with its supporting point.

If in the practical use of all of the instruments hereinbefore described, it is not the absolute value of the currents in the various windings, but rather only the relations between the currents that are employed, the couple or torque, on the contrary, is proportional, cæteris paribus, to the square of the field. Hence, it is possible to vary the natural period of the galvanometer inside wide limits by varying the absolute value of the currents. Thus the galvanometer Figure 6 should have a natural period over 100 cycles per second to be suited for the purpose in question. Calculation further shows that, from the viewpoint of rapidity of operation, it is desirable to choose the cross-section of the mobile turn in such a manner that its resistance will be approximately equal to its reactance. Hence, it will be desirable, under otherwise equal conditions, to choose the frequencies rather high, for instance, of an order of a few thousand cycles per second, so as to realize a high-speed device.

In the above I have described an apparatus with electrodynamic action operating with alternating current; for which the final position of equilibrium is determined by the relations of the currents flowing through the different exciting coils.

What follows has as its object to provide a damping means of the moving-coil movement, which means is purely electrical and, besides, regulatable in a continuous manner.

This means consists in superposing on the driving alternating current, flowing through the coils, a direct current which is preferably regulatable. In this manner, Foucault currents are induced during the movement of the moving coil, thereby producing the means for obtaining any desired amount of damping, particularly the critical damping, by adjusting the intensity of the auxiliary direct current to the suitable value. The manner in which the variable direct current is supplied to the coils is indicated in Figure 1 wherein a direct current generator 20, shunted by a varable resistance 21, is connected in series with the windings and with the alternating current source 22.

I claim:

1. A frequency meter comprising a pair of coils in series and disposed in almost closed independent magnetic circuits a condenser shunted across one of said coils and adapted to tune the combination of said condenser and shunted coil to a frequency lower than the lowest frequency to be measured, a second condenser shunted across said other coil said last named combination of condenser and shunted coil being tuned to a frequency above the highest frequency to be measured.

2. In an alternating current electric responsive device of the electro-magnetic type, a plurality of inductor systems each consisting of an independent almost closed magnetic circuit and a coil arranged in pairs, an induced system for each of said pairs each of said induced systems comprising a short-circuited winding, all of said induced systems being mechanically interconnected and arranged so as to form a movable unit, the stable balanced position of which is dependent only upon the current relations between the different coils while the natural frequency is dependent upon the absolute value of the amplitude of these currents.

3. In an electrical responsive device of the electro-dynamic type a pair of inductor systems each consisting of an independent almost closed magnetic circuit and a coil, an induced system interposed intermediate said inductor systems comprising a short-circuited circuit, an indicating device mechanically connected to said short-circuited circuit and means whereby said indicating device is operated in accordance with the relationship of the currents in said inductor systems.

4. In an electrical responsive device a pair of inductor systems each consisting of an independent almost closed magnetic circuit and a coil, an induced system interposed intermediate said inductor systems comprising a short-circuited electrical circuit, an indicating device mechanically connected to said last named circuit and means whereby said indicating device is operated in accordance with the relationship of the currents in said inductor systems and damping means connected to said inductor systems.

HENRI CHIREIX.